(12) United States Patent
Pilcher et al.

(10) Patent No.: US 11,686,301 B2
(45) Date of Patent: Jun. 27, 2023

(54) PUMP SYSTEM WITH LEAK DAMAGE PROTECTION

(71) Applicant: Northern Tool & Equipment Company, Inc., Burnsville, MN (US)

(72) Inventors: Matthew R. Pilcher, Owatonna, MN (US); Timothy Rancourt, Lakeville, MN (US)

(73) Assignee: NORTHERN TOOL & EQUIPMENT COMPANY, INC., Burnsville, MN (US)

( * ) Notice: Subject to any disclaimer, the term of this patent is extended or adjusted under 35 U.S.C. 154(b) by 42 days.

(21) Appl. No.: 16/822,376

(22) Filed: Mar. 18, 2020

(65) Prior Publication Data

US 2020/0318628 A1 Oct. 8, 2020

Related U.S. Application Data

(60) Provisional application No. 62/828,457, filed on Apr. 2, 2019.

(51) Int. Cl.
*F04B 43/00* (2006.01)
*F04B 43/04* (2006.01)
(Continued)

(52) U.S. Cl.
CPC ............ *F04B 43/009* (2013.01); *F04B 43/04* (2013.01); *F04B 49/02* (2013.01); *F04B 17/03* (2013.01);
(Continued)

(58) Field of Classification Search
CPC .. F04B 43/009; F04B 2207/703; F04B 1/141; F04B 2201/0208; F04B 2201/0405;
(Continued)

(56) References Cited

U.S. PATENT DOCUMENTS 2,303,597 A * 12/1942 Adelson ................ F04B 43/067
417/63
3,105,442 A 10/1963 Howerton
(Continued)

FOREIGN PATENT DOCUMENTS

GB 1395403 5/1975
JP 61275589 12/1986
(Continued)

OTHER PUBLICATIONS

NorthStar Soft Wash; NorthStar 49 Litre Hand Cart 15.1 LPM Soft Wash System; Model No. NTE#: 157140; www.nteinternational.com.
(Continued)

*Primary Examiner* — Nathan C Zollinger
*Assistant Examiner* — Timothy P Solak
(74) *Attorney, Agent, or Firm* — Taft Stettinius & Hollister LLP; Stephen F. Rost (57) ABSTRACT

An electric diaphragm pump having a pump head assembly in a first housing, a motor assembly in a second housing, a fluid sensor, and a leak alert system and/or pump shut-off system. The fluid sensor detects a presence of fluid which has leaked outside of a pump chamber and is located within a cavity of the diaphragm drive chamber. The leak alert system indicates that fluid has been detected by the fluid sensor and the shut-off control system stops operation of the pump based on fluid being detected by the fluid sensor.

19 Claims, 8 Drawing Sheets

(51) Int. Cl.
*F04B 49/02* (2006.01)
*F04B 49/10* (2006.01)
*F04B 17/03* (2006.01)

(52) U.S. Cl.
CPC .......... *F04B 43/0045* (2013.01); *F04B 49/10* (2013.01); *F04B 2201/0208* (2013.01); *F04B 2201/0803* (2013.01); *F04B 2207/701* (2013.01); *F04B 2207/702* (2013.01); *F04B 2207/703* (2013.01)

(58) Field of Classification Search
CPC ........ F04B 2201/083; F05B 2270/1076; F05B 2260/80; F05B 2270/402; F05B 2270/502
See application file for complete search history.

(56) References Cited

U.S. PATENT DOCUMENTS

| | | | |
|---|---|---|---|
| 3,131,638 A | | 5/1964 | Wilson et al. |
| 3,914,752 A | | 10/1975 | Howard et al. |
| 4,781,535 A | | 11/1988 | Frawley et al. |
| 4,934,902 A | | 6/1990 | Mantell |
| 4,971,523 A | * | 11/1990 | Wacker ............ F04B 43/009 340/605 |
| 5,501,577 A | | 3/1996 | Cornell et al. |
| 6,299,414 B1 | * | 10/2001 | Schoenmeyr ........ F04B 43/009 417/244 |
| 8,643,497 B2 | | 2/2014 | Murphy |
| 9,932,981 B2 | | 4/2018 | Cosgrove et al. |
| 2004/0265154 A1 | * | 12/2004 | McDowell ............ F04B 43/009 417/474 |
| 2010/0302047 A1 | | 12/2010 | Wood | |

FOREIGN PATENT DOCUMENTS

| | | | | |
|---|---|---|---|---|
| JP | 55119988 | | 2/1989 | |
| JP | 01147179 | | 6/1989 | |
| JP | 11 304311 | * | 11/1999 | .............. F25B 49/04 |
| WO | 2018195310 | | 10/2018 | |

OTHER PUBLICATIONS

Northern Tool + Equipment; NorthStar Soft Wash and Disinfectant System with 4.0 GPM Bleach Pump Item# 157140; https://www.northerntool.com/shop/tools/product_200756183_200756183.

Northern Tool + Equipment; NorthStar 2.2 GPM Soft Wash and Disinfectant Bleach Pump Item# 157145; https://www.northerntool.com/shop/tools/product_200756185_200756185?isSearch=157145.

Northern Tool + Equipment; NorthStar 4.0 GPM Soft Wash and Disinfectant Bleach Pump Item# 157147; https://www.northerntool.com/shop/tools/product_200756186_200756186?isSearch=157147.

Northern Tool + Equipment; NorthStar 5.5 GPM Soft Wash and Disinfectant Bleach Pump Item# 157153; https://www.northerntool.com/shop/tools/product_200756187_200756187?isSearch=157153.

Northern Tool + Equipment; NorthStar Replacement Pump Cartridge with Motor Armor—2.2 GPM. Fits Item# 157145 https://www.northerntool.com/shop/tools/product_200756276_200756276?isSearch=a157145.

Northern Tool + Equipment; NorthStar Replacement Pump Cartridge with Motor Armor-4.0 GPM, Fits Item# 157147 https://www.northerntool.com/shop/tools/product_200756277_200756277?isSearch=a157147.

Northern Tool + Equipment; NorthStar Replacement Pump Cartridge with Motor Armor—5.5 GPM, Fits Item# 157153; https://www.northerntool.com/shop/tools/product_200756278_200756278?isSearch=a157153.

NorthStar Bleach Sprayer System; NorthStar 49 Litre Soft Wash Sprayer; http://www.nteinternational.com/bleach-sprayer-system.html.

North Star Soft Wash System with 4.0 GPM Bleach Pump; Northern Tool Catalog #2051, p. 49.

Pressure Washers; Northern Tool Catalog #2055, p. 154.

European Search Report dated Sep. 14, 2020 from corresponding European Application No. 20166963.7.

* cited by examiner

PUMP SYSTEM WITH LEAK DAMAGE PROTECTION

CROSS-REFERENCE TO RELATED APPLICATIONS

This application claims benefit to U.S. Provisional Application No. 62/828,457 filed Apr. 2, 2019, which is incorporated by reference herein in its entirety.

FIELD OF THE DISCLOSURE

This disclosure is generally directed to an improved pump system and method, and more specifically to a pump system for protecting against damage due to the leaking of pumped fluid.

BACKGROUND

In various pump systems, leakage of the pumped fluid may lead to damage of sensitive components within the pump and/or may harm the external environment. As such, there is a need for an improved pump system to mitigate and/or protect from damage due to leaked pump fluid.

SUMMARY

According to some various embodiments, disclosed is a pump including a leak damage protection system, which alerts of a leak and/or stops the pump from operating upon detection of a leak. In embodiments, the disclosed pump system includes a fluid sensor located outside a pump chamber where leaked fluid may collect. In embodiments, the pump may include a leak alert system configured to indicate or alert when fluid has been sensed by the fluid sensor, and/or a shut-off control system, which stops the pump from operating upon sensing a leak by the fluid sensor. In some embodiments, the disclosed pump system may comprise a replaceable pump head assembly. Thus, potential damage due to leakage of fluid through the pump chamber and/or damaged diaphragm may be prevented and/or mitigated.

According to some embodiments, disclosed is a pump which may comprise a pump chamber through which fluid may be pumped; a seal configured to prevent said fluid from leaking out of the pump chamber; a fluid sensor located in a pump area outside of the pump chamber, wherein said fluid sensor configured to detect a presence of fluid which has leaked outside of the pump chamber; and a leak alert system configured to indicate that fluid has been detected by the fluid sensor and/or a shut-off control system configured to stop operation of the pump based on fluid being detected by the fluid sensor.

In some embodiments the pump comprises both the leak alert system and the shut-off control system. In further embodiments, a pump area comprising the seal is removable and/or replaceable. In yet further embodiments, the pump is a diaphragm pump, and wherein the seal is at least partially formed from a diaphragm component.

In other embodiments, the pump area in which said fluid sensor is located is a fluid collection zone. In further embodiments, the fluid sensor comprises a first probe and a second probe spaced apart from the first probe by an air gap, wherein the presence of fluid across the air gap creates a conductive path between the first probe and the second probe. In yet further embodiments, the first probe and said second probe are components of a circuit which activates said leak alert system and/or the shut-off control system. In some embodiments, the fluid sensor further comprises a base which supports the first probe and the second probe. In further embodiments, the base is curved to form a fluid collection zone and/or to integrate within a cavity of the pump. In yet further embodiments, the leak alert system is in wired and/or wireless communication with the fluid sensor.

According to some embodiments, disclosed is an electric diaphragm pump which may comprise a pump head assembly in a first housing; a motor assembly in a second housing; a fluid sensor; and a leak alert system and/or pump shut-off system, wherein the first housing is coupled to the second housing, wherein said pump head assembly includes a seal comprising a diaphragm between a pump chamber, and a diaphragm drive chamber, wherein the diaphragm drive chamber includes diaphragm drive components configured to drive a pumping motion of the diaphragm, and wherein fluid may be pumped through the pump chamber via said pumping motion, wherein the seal is configured to prevent said fluid from leaking out of the pump chamber, wherein the fluid sensor is configured to detect a presence of fluid which has leaked outside of the pump chamber, and wherein the fluid sensor is located in a pump area outside of the pump chamber, wherein the leak alert system is configured to indicate that fluid has been detected by the fluid sensor and wherein the shut-off control system is configured to stop operation of the pump based on fluid being detected by the fluid sensor.

In some embodiments, the fluid sensor is located within a cavity of the diaphragm drive chamber. In further embodiments, the fluid sensor includes a base which is shaped to integrate with said first housing. In yet further embodiments, the fluid sensor includes a base which is shaped to form a fluid collection zone. In further embodiments, the pump comprises circuitry for the leak alert system and for the leak shut-off control system, wherein said circuitry is located in a third housing coupled to said second housing, and wherein said leak alert system and said leak shut-off control system are in communication with the fluid sensor.

In some embodiments, the first housing is removable from the second housing. In further embodiments, the diaphragm drive components include a wobble plate in driving engagement with a diaphragm pumping member via an output shaft of the motor assembly. In yet further embodiments, the pumping member includes one or more pistons which are integral with the diaphragm.

According to some embodiments, disclosed is a pump method to protect a pump from internal component damage due to leaking of pumped fluid within the pump and/or to protect an external pump environment from damage due to leaking of pumped fluid, which may comprise detecting fluid within an area of the pump outside a pump chamber of the pump via a fluid detector located within the pump, and providing an alert upon detection of leaked fluid within the pump and/or stopping operation of the pump upon detection of leaked fluid within the pump. In some embodiments, the method may comprise replacing and/or repairing a damaged pump component upon detection of leaked fluid within the pump.

According to various embodiments, disclosed is a pump system which may comprise: a pump system configured to convey fluid through a pump system fluid channel via at least one pump; a fluid sensor configured to detect a presence of said fluid which has leaked outside of said pump system fluid channel; and a leak alert system configured to indicate that leaked fluid has been detected by the fluid sensor and/or a shut-off control system configured to stop operation of the pump based on leaked fluid being detected by the fluid sensor. In some embodiments, the pump is a fluid supply pump. In some embodiments, the pump is an electrical diaphragm pump. In further embodiments, the fluid senor is located within the pump. In yet further embodiments, the fluid sensor is configured to detect fluid which has leaked from a pumping chamber of the pump.

In other embodiments, the fluid sensor is external to the pump. In further embodiments, the fluid sensor is in remote communication with the leak alert system and/or pump shut-off control system. In further embodiments, the pump system is configured to supply fluid for a recreational vehicle ("RV").

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to a component or step in the singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, the terms "approximate", "approximately", "about", etc. refer to a deviation of +/−5% of the whole, based on the context, unless explicitly stated otherwise.

In various pump systems, leakage of the pumped fluid through the pump chamber into other areas of the pump may damage sensitive components of the pump. Such components may include the pump motor, fittings, pressure switch electrical circuitry, wiring, and the like. Additionally, fluid leaked out of the pump may contaminate the external environment.

In electrical diaphragm pumps, degradation of the pump diaphragm, which, in normal operation, typically seals off the pump chamber from other areas of the pump, may be a particular cause for fluid leakage, as the diaphragm may be prone to wear. Causes for a damaged diaphragm may include exposure to the pumped fluid, which may damage the diaphragm material, and in many cases, eventually cause it to lose elasticity and become brittle. Additional or alternate causes for a damaged diaphragm may include a constant stretching motion of the diaphragm during operation of the pump. Moreover, various pump systems/applications use fluid which may be particularly corrosive and/or degrading to the pump diaphragm, as well as other pump components into which the fluid may leak once the diaphragm fails. Such fluids may include bleach (i.e. sodium hypochlorite, which may commonly be used for mold treatment applications in the soft washing industry); various oils and fuels such as petroleum based fluids, and the like.

In addition to causing damage to internal components of the pump, pumped fluid may leak outside the pump itself, and may contaminate and/or cause damage to external surrounding areas and surfaces. For example, a cabinet or storage area housing an RV pump may incur water damage due to pump leaking, or an agricultural pump may leak pesticides into unwanted areas.

As such, there is a need for a pump system designed to protect against damage to internal components of the pump and/or prolong the life of a pump. Additionally or alternatively, there is a need for a pump system designed to protect against damage to the external pump environment due to leakage of pumped fluid.

In accordance with various embodiments, and with reference to the accompanying figures, the present disclosure provides a pump leak protection system comprising a pump and pump method, which alerts of a leak and/or stops the pump from operating upon detection of a leak. In embodiments, the disclosed pump includes a fluid sensor located outside a pump chamber (i.e. pump area which should be free from pumped fluid in normal operation). In embodiments, the pump may include a leak alert system configured to indicate or alert when fluid has been sensed by the fluid sensor, and/or a shut-off control system, which stops the pump from operating upon sensing a leak by the fluid sensor. In some embodiments, the disclosed pump system may comprise a replaceable pump head assembly. Thus, potential damage due to leakage of fluid through the pump chamber and/or a damaged diaphragm may be prevented or mitigated.

Figure 1:
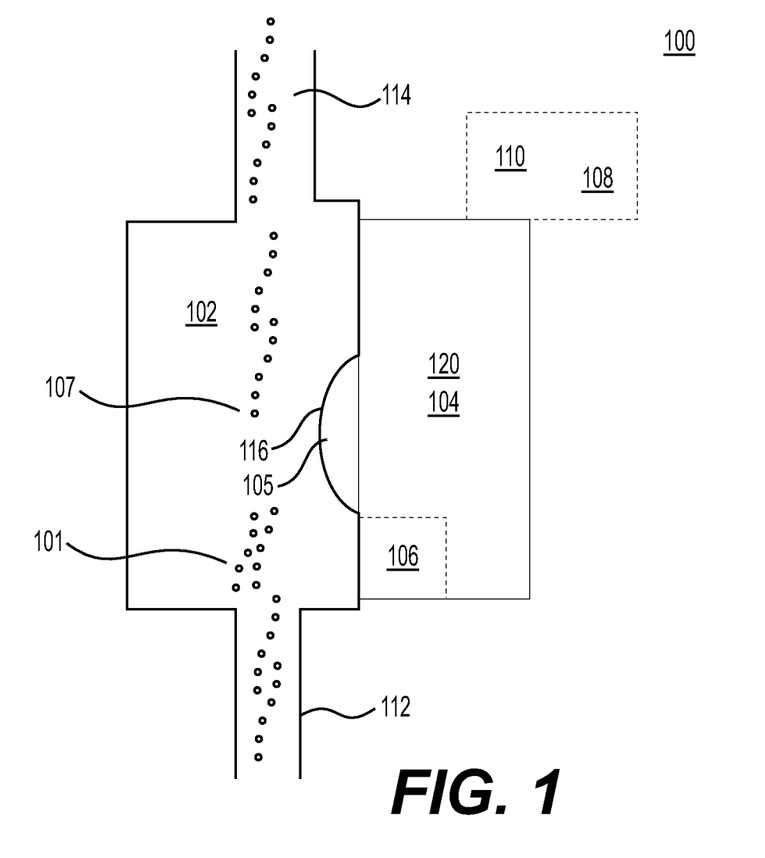
FIG. 1 is a generalized schematic view of a pump including a leak damage protection system, in accordance with various embodiments.

With particular reference to FIG. 1, a pump or pump system 100 including a leak damage protection system, in accordance with various embodiments, may generally comprise a pump chamber 102 through which fluid 101 may be pumped; and a fluid sensor 106 configured to sense fluid which has leaked outside of pump chamber 102. In embodiments, the fluid sensor 106 is located in a pump area 104 outside of pump chamber 102. In some embodiments, pump 100 may comprise a leak alert system 108 configured to indicate that fluid has been detected by the fluid sensor 106. In some embodiments, pump 100 may comprise a shut-off control system 110 configured to stop operation of the pump based on fluid 101 being detected by the fluid sensor 106.

Pump chamber 102 may include a seal 105, which, under normal conditions, prevents fluid 101 from leaking out of chamber 102 (e.g. into pump area 104), and possibly coming into contact with other pump components 120 located outside of pump chamber 102. However, when the seal 105 is damaged or otherwise fails, pumped fluid 101 may leak out of pump chamber 102. In some cases, leaked fluid may come into contact with other components 120 located outside of pump chamber 102, subjecting these components to damage and/or degradation from contact with pump fluid 101. Pump components 120 which may be subject to damage from contact with leaked fluid may include the pump motor, which may be an expensive component of the pump. Other components which may be subject to damage may include a pump pressure switch, electrical circuitry, wiring, etc. In some cases, leaked fluid may exit pump 100 and contaminate and/or cause damage to surrounding areas and surfaces.

However, detection of fluid 101 by fluid sensor 106 may cause the leak alert system 108 to alert of the leak and/or the shut-off control system 110 to stop pumping operation. As such, leaked fluid 101 may be prevented from contaminating and/or damaging pump 100 including components 120, and/or surrounding areas.

Additionally, a pump area 107 comprising the seal 105 may be removable from the pump 100 and may further be replaceable, according to various embodiments. As such, prompt detection of leaked fluid may allow the seal 105 and/or chamber 102 to be replaced and/or repaired to preserve or prolong the life of the pump 100.

According to various embodiments, pump 100 may be a diaphragm pump, wherein seal 105 may be at least partially formed from a diaphragm 116. (A particular example of a diaphragm pump is shown in FIGS. 4-10). In such a pump, a motion of the diaphragm 116 may create varying pressure in pump chamber 102 causing pumped fluid 101 to be drawn from at least one inlet 112 of the pump chamber 102 and forced through at least one outlet 114 of the chamber 102. In embodiments, various valves, (not shown in the figure), may be included across pump chamber 102, inlet 112, and/or outlet 114. Such valves may include, for example, check valve(s), butterfly valve(s), flap valve(s), and/or other form of shut-off valves.

As the diaphragm 116 may typically be made of a semi-flexible/elastomeric material (e.g. rubber, thermoplastic, Teflon®, etc.) and may be in constant stretching motion and/or contact with the pumped fluid during operation, it is particularly vulnerable to degradation. Additionally, certain pumping application may employ corrosive fluid, which further exacerbates wear of the diaphragm 116. Therefore, diaphragm pumps may be highly prone to leakage due to a degraded diaphragm, and may particularly benefit from the presently disclosed leak damage protection system.

Fluid Sensor

According to various embodiments, fluid sensor 106 may be located in pump area(s) 104 outside pump chamber 102, including other chambers and/or cavities within the pump where fluid leaking out of pump chamber 102 or other locations may be found and/or tend to collect or pool ("fluid collection zone"). In some embodiments, fluid sensor 106 may be located in an area 104 where fluid may leak due to a damaged seal 105 and/or diaphragm 116. In embodiments, pump area 104 may be immediately adjacent chamber 102, though this need not necessarily be the case. In some embodiments, fluid sensor 106 may be located in a housing 411d of a pressure switch assembly 411 into which fluid may leak (e.g. from an outlet pumping chamber) due to a damaged pressure switch seal 411b. (see FIG. 6).

According to various embodiments, the sensor 106 may be located outside of the pump itself. This may include any location along a pump system fluid channel through which fluid may leak. (The pump system fluid channel may be defined as a channel through which fluid is conveyed via at least one pump, and may include any plumbing line(s), hose(s), fixture(s), control(s), and/or manifold(s), etc. in addition to the pump(s) itself. As such, a sensor external to the pump 100 may be located, for example, in the immediate vicinity of the pump 100, including a surface on which the pump is supported, and/or around potential leak sites wherein fluid may leak outside of the pump (e.g. around junctures between adjoining pump components, gutter(s) and/or other openings within the pump). In another example, such external fluid sensor 106 may be positioned around plumping lines/joints, and/or various elements connected to the plumbing (e.g. control(s), manifold(s), sinks(s), shower (s), etc.), which may be potential leak points. Additionally, such external sensor may be in remote (i.e. wireless) communication with the leak alert system 108 and/or shut-off control system 110 of the pump, according to various embodiments. In some embodiments, the pump system fluid channel including at least one fluid supply pump and at least one sensor 106 may be utilized for an RV.

Figure 2:
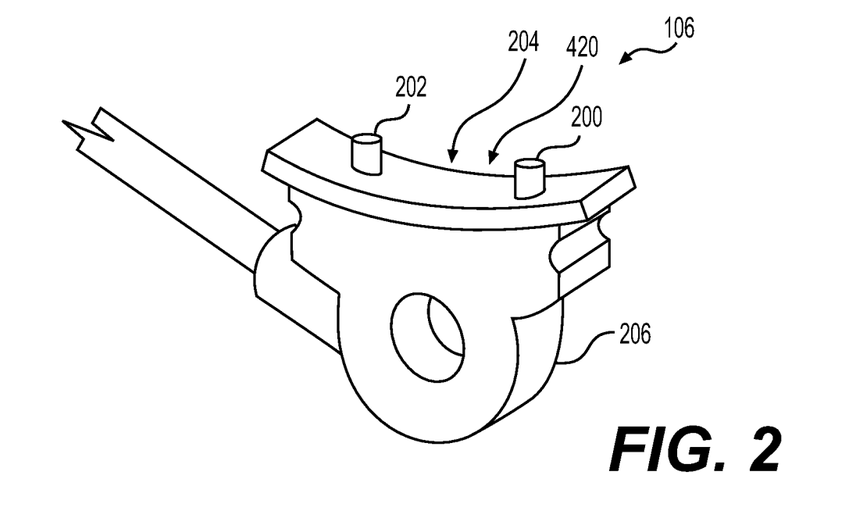
FIG. 2 shows a fluid sensor for the pump of FIG. 1, in accordance with various embodiments.

According to an exemplary embodiment, fluid sensor 106 may utilize the electrical conductivity of the leaked fluid to decrease a resistance across two contacts as illustrated in FIG. 2. As shown, fluid sensor 106 may comprise two spaced apart probes 200, 202, wherein an air gap 204 between the probes acts as a switch, that when bridged by the presence of fluid, closes a circuit 300 (see, for example, FIG. 3) which activates the leak alert system 108 and/or shut-off control system 110. According to various embodiments, probes 200, 202 may be spaced apart by about 0.25 inches (0.635 cm) to about 1 inch (2.54 cm), or by about 0.5 inches (1.27 cm).

Figure 8:
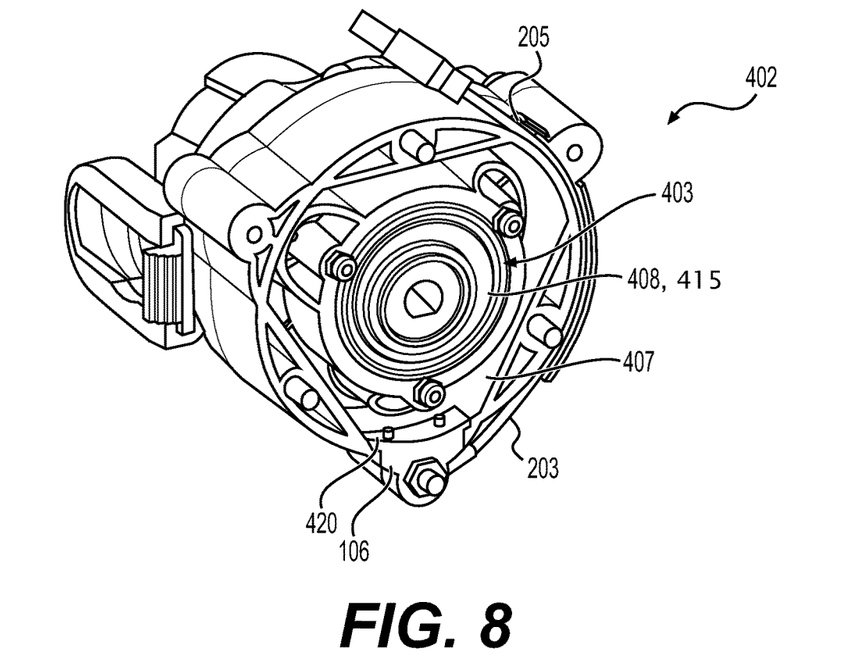
FIG. 8 shows the pump of FIG. 4, with the pump head housing removed from the motor housing, and further shows a back side of the pump head assembly including a wobble plate, in accordance with various embodiments.
Figure 9A:
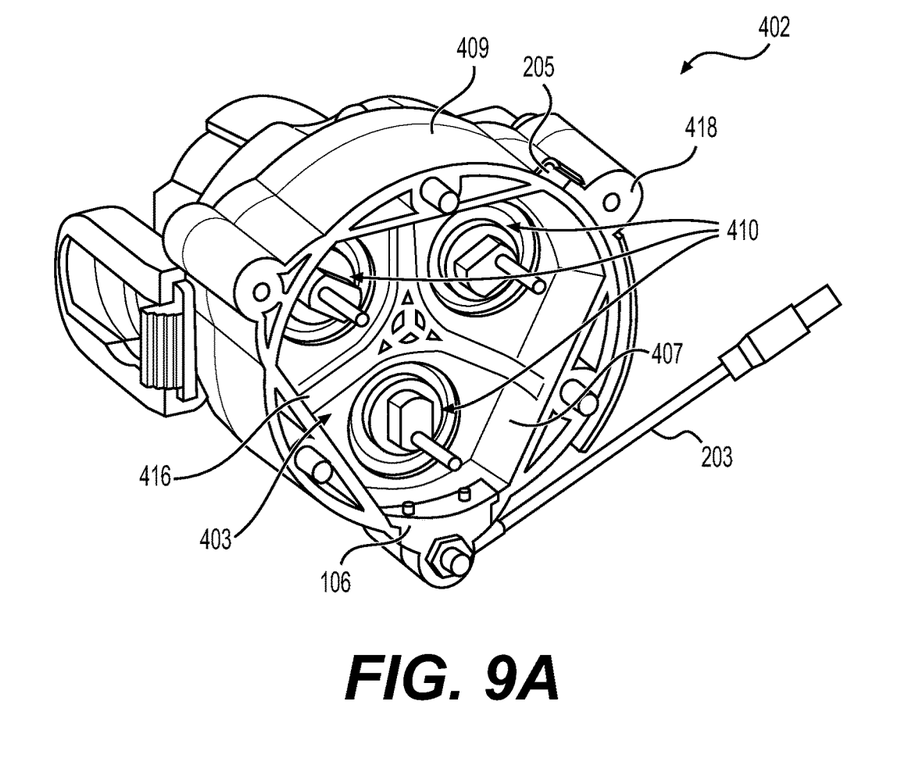
FIG. 9A shows the back side of the pump head assembly shown in FIG. 8, with the wobble plate removed to show a back side of the pump diaphragm, in accordance with various embodiments.
Figure 9B:
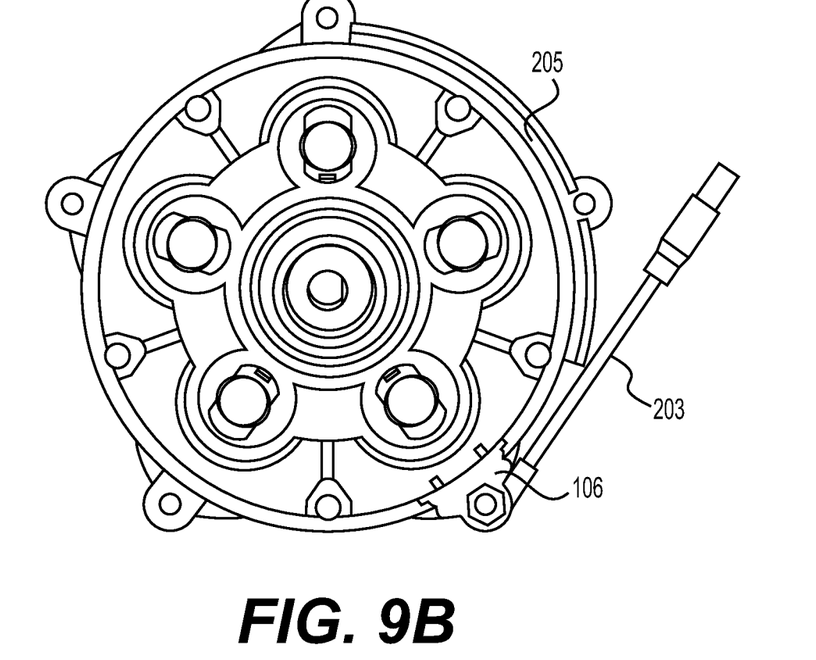
FIG. 9B shows a back side of a pump head assembly for a 5-chamber pump, according to an alternate embodiment, wherein the fluid detector is shown at a higher position within the pump cavity.

In some embodiments, probes 200, 202 may be supported on a base 206 which may include sensor wire(s) 203 for connecting probes 200, 202 to circuit 300. In some embodiments, sensor wire(s) 203 may be routed in a channel 205 around the outside of the drive chamber housing (See FIG. 8). In some embodiments, base 206 may include a depression or concavity between probes 200, 202, to facilitate fluid collection (i.e. form a fluid collection zone) and/or to enable the base 206 to situate and/or integrate within a cavity of the pump where leaking fluid may pool (see FIGS. 8 and 9).

According to another embodiment, fluid sensor 106 may include a float switch, which may function to close a circuit by floatation given a sufficient accumulation of fluid. The presently disclosed system further contemplates other fluid detection methods which may utilize various properties of fluid and/or properties of a specific type of fluid, such as electrical properties (e.g. conductivity, capacitance, etc.), mechanical properties, optical properties, chemical properties, etc., according to various embodiments.

Fluid Alert and Pump Shut-Off Control Systems

In embodiments, a leak alert system 108 may include an alarm, which may utilize various sound(s), light(s), text message(s), etc. to alert a user that fluid has been detected by the fluid sensor 106. In embodiments, such alert system may be in wired and/or wireless communication with the fluid sensor 106. For example, the leak alert system 108 may include flashing lights and/or an alarm sounding device provided on pump 100 (see FIG. 4) and/or on the fluid sensor 106 itself, or may relay a message to a user's device (e.g. cell phone) via text, email, etc. In addition to, or instead of an alert, the disclosed system may cause pump 100 to stop operating via the shut-off control system 110 which may be in wired and/or wireless communication with the fluid sensor 106. Additionally, the shut-off control system 110 may stop the pump motor by disabling current flow, according to various embodiments.

Figure 3:
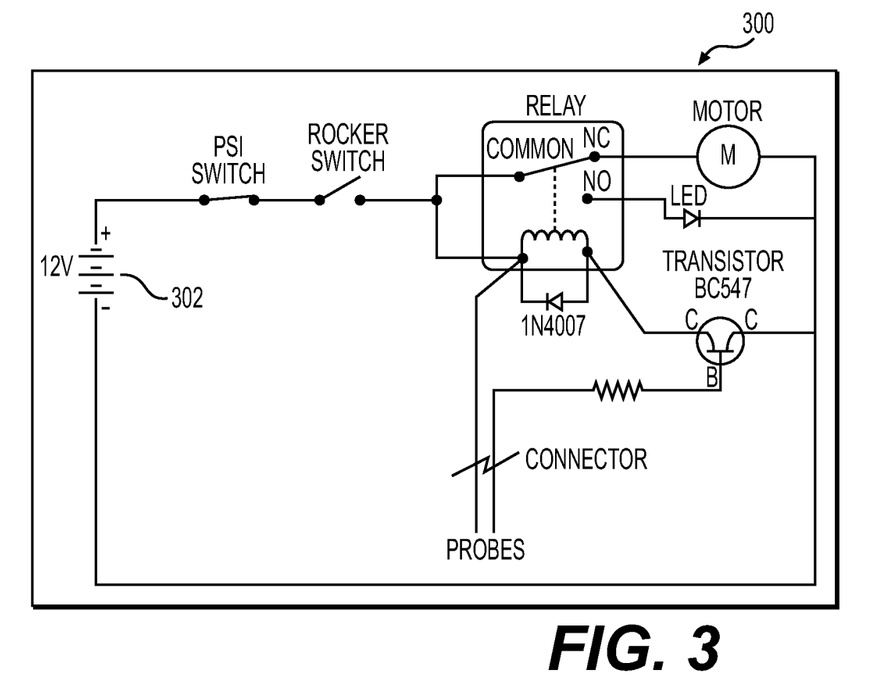
FIG. 3 is a circuit diagram of a combined leak alert system and shut-off control system, in accordance with various embodiments.

FIG. 3 shows an electronic circuitry 300 for operating the leak alert system 108 and shut-off control system 110 according to an exemplary embodiment. In embodiments, circuitry 300 may connect to fluid sensor 106, wherein upon fluid detection by sensor 106, circuit 300 closes, enabling current to flow from a battery 302 to initiate an alert according to leak alert system 108 and to shut off the pump motor according to shut-off control system 110.

Electric Diaphragm Pump

An electric diaphragm pump 400, including fluid sensor 106 and fluid alert and/or shut-off systems 108, 110, according to an exemplary embodiment of pump system 100 is shown in FIGS. 4-10. As shown, pump 400 may comprise a first housing 401 for a pump head assembly 402 including inlet 112 and outlet 114. Housing 401 may further include a pressure switch assembly 411 (including pressure switch 411a within housing 411d, and pressure switch seal 411b), configured to receive pressure switch wires 413. Pump 400 may further include a second housing 404 for a motor assembly 405.

Figure 4:
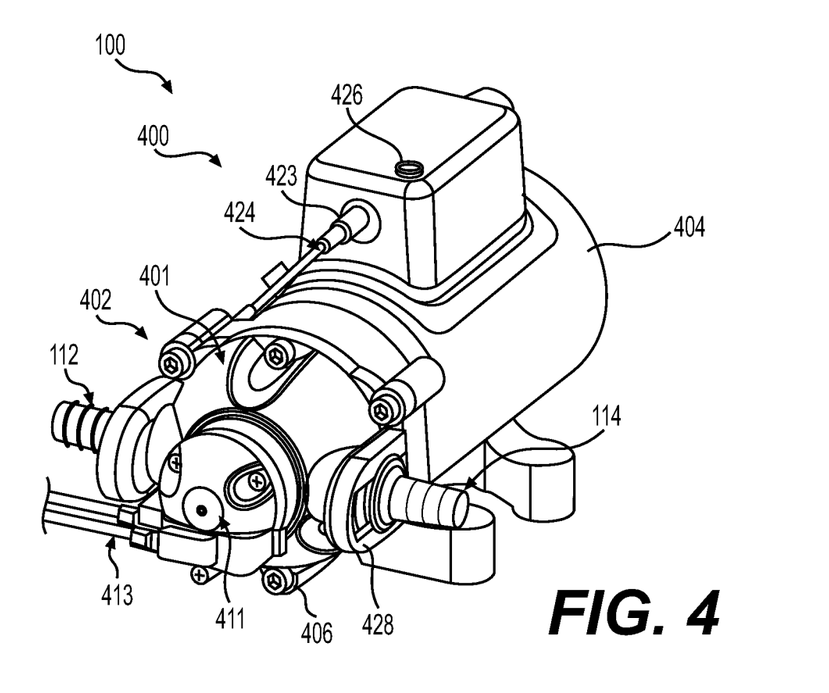
FIG. 4 is an exemplary embodiment of a diaphragm pump, including the leak damage protection system of FIG. 1, in accordance with various embodiments.
Figure 5:
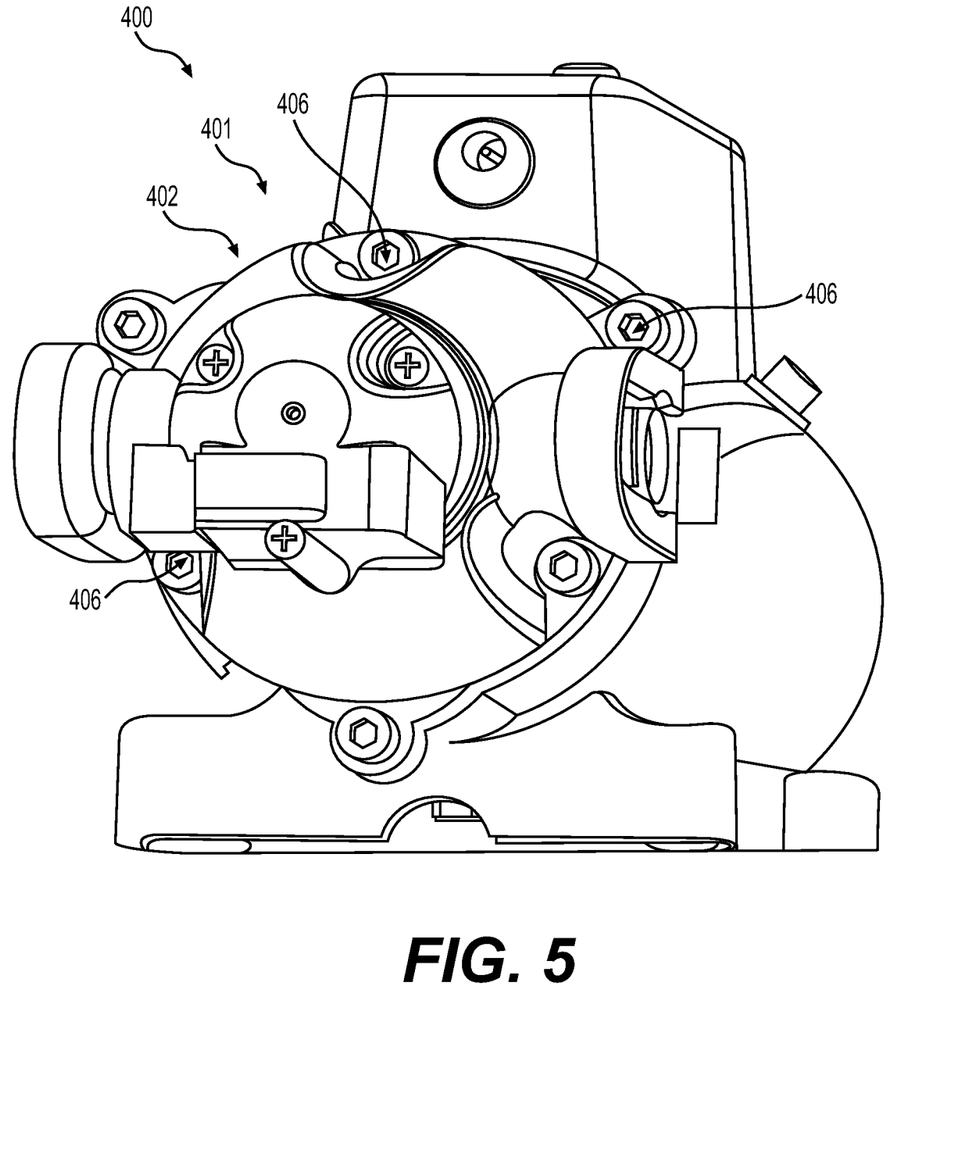
FIG. 5 is a front view of the pump of FIG. 4, in accordance with various embodiments.
Figure 6:
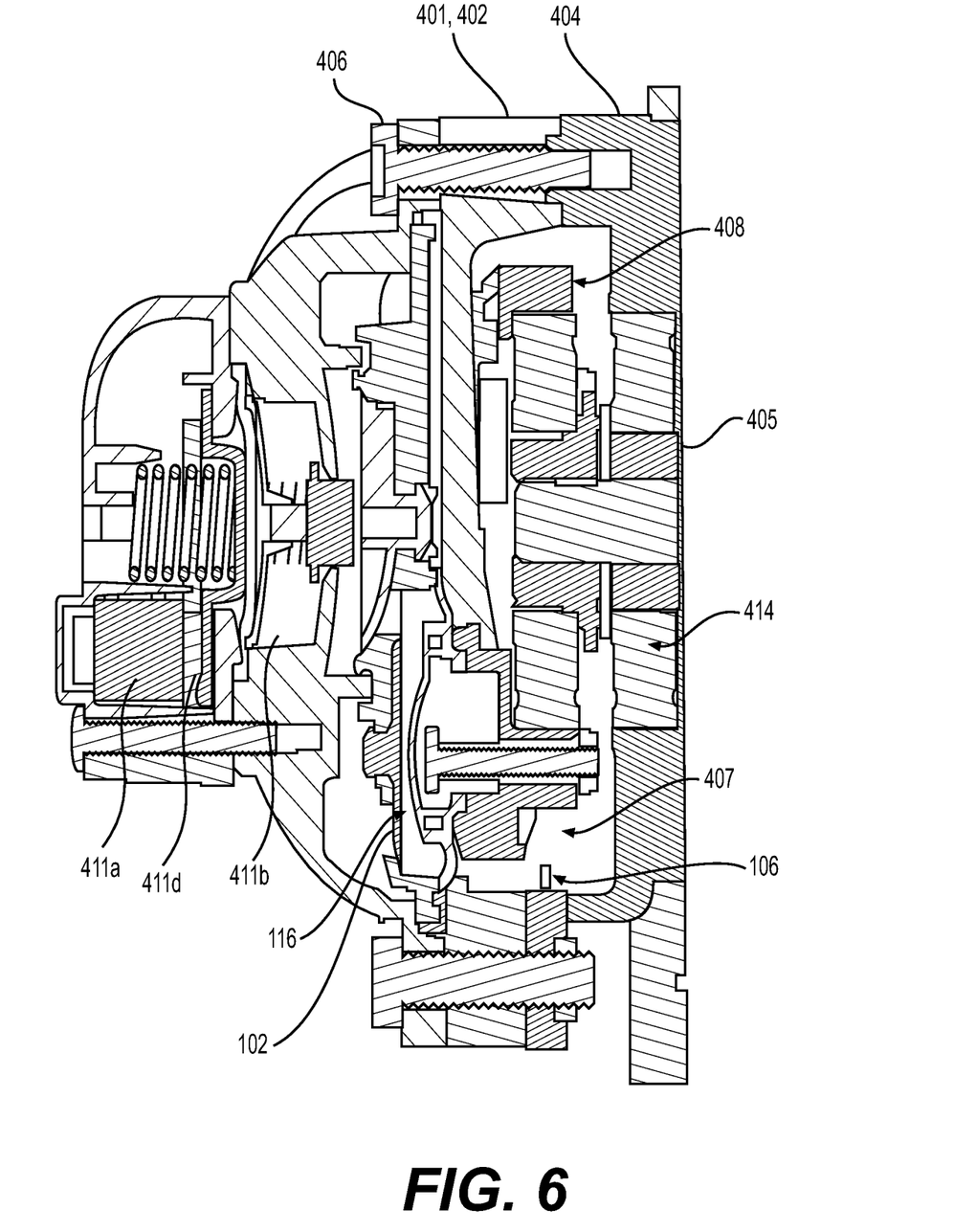
FIG. 6 is a cross section view of the pump of FIG. 4, in accordance with various embodiments.
Figure 7:
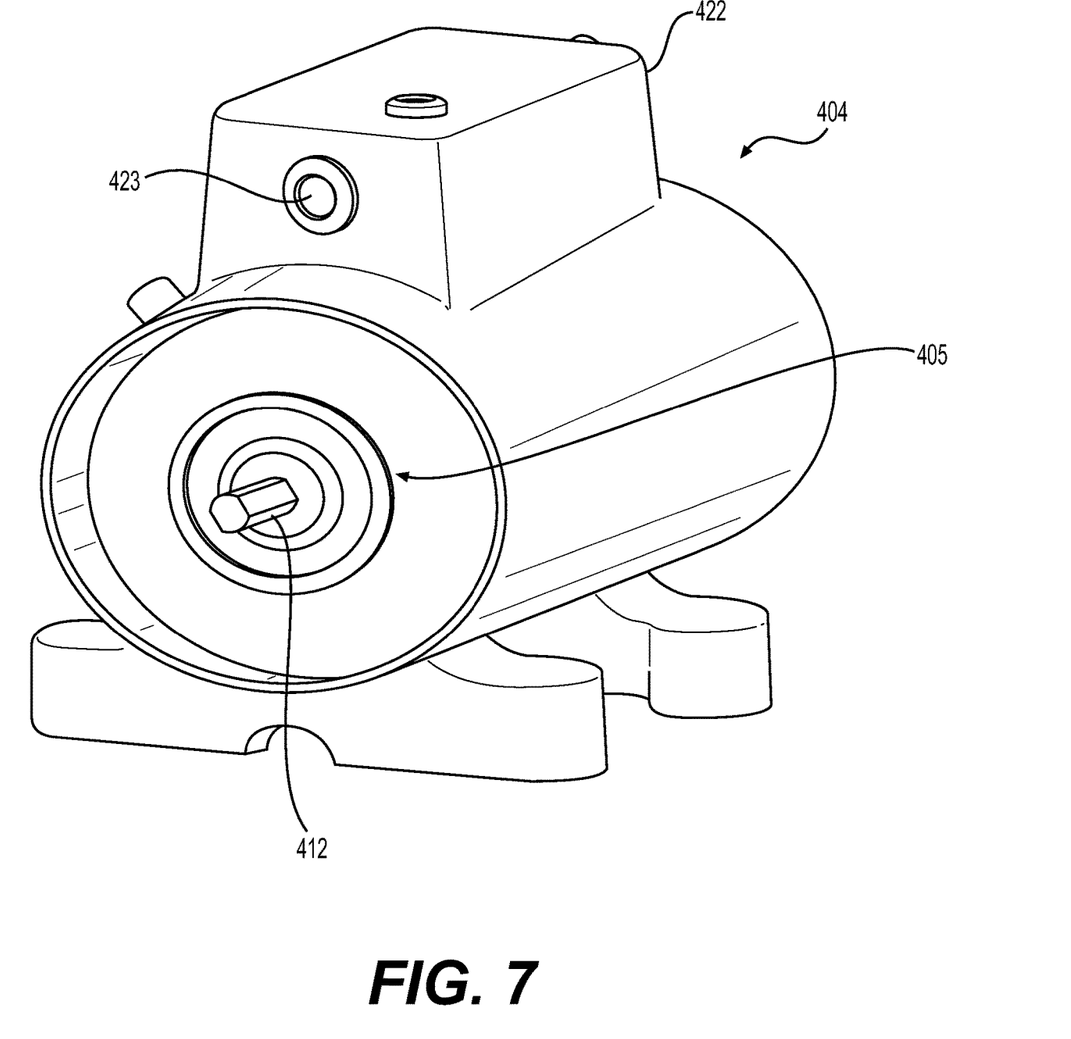
FIG. 7 shows the pump of FIG. 4 with a motor housing of the pump removed from a pump head housing of the pump, and further shows a front side of a motor assembly within the motor housing, in accordance with various embodiments.

First housing 401 ("pump head housing") may be coupled to second housing 404 ("motor housing") via attachment members 406. In embodiments attachment members 406 may include, for example, threaded fasteners, i.e. screws.

According to various embodiments, pump head assembly 402 may include at least one diaphragm 116 between pump chamber 102 and a diaphragm drive chamber 403. The diaphragm drive chamber 403 may include diaphragm drive components 415 for driving a pumping motion of the diaphragm 116. Additionally, diaphragm may form seal 105 separating pump chamber 102 from the diaphragm drive chamber 403.

In some embodiments, diaphragm drive components 415 may comprise a wobble plate 408 which may be in driving engagement with a diaphragm pumping member 409 via an output shaft 412 of the motor assembly 405. (It noted, that while a wobble plate driving mechanism is described herein, diaphragm pump 400 may include other driving mechanisms, such as, for example, a reciprocating drive, according to various embodiments).

In embodiments, pumping member 409 may include one or more pistons 410 configured to induce pumping motion of the diaphragm 116. In some embodiments, pumping members 409, i.e. pistons 410 may be integral with the diaphragm 116, as shown in FIGs. 9A-9B.

In the event of diaphragm failure, fluid may leak through a back side 416 of the diaphragm 116, including through various openings, such as connection points 418 between the wobble plate and diaphragm pistons. As such, the leaked fluid may initially fill or collect within a cavity 407 of the drive chamber 403. The fluid may then penetrate a motor bearing 414 and motor of the motor assembly 405 within the motor housing 404.

According to various embodiments, and with particular reference to FIGS. 8, and 9, fluid sensor 106, including probes 200, 202 and base 206 may be located within the cavity 407 ("drive chamber cavity"). As shown, base 206 may be shaped to integrate with and form a bottom portion of the housing 401. Though in some embodiments, fluid sensor 106, base 206 may be located and/or integrate with a higher portion of the housing 401 (see FIG. 9B). According to one embodiment, an upper surface 420 of the base 206 may be concaved to facilitate fluid collection between probes 200, 202. In embodiments wherein the pump housing is cylindrical, the concaved orientation of the upper surface 420 may be suitable for both fluid collection and for integrating with the pump housing, as shown in the figures.

In embodiments, pump 400 may further include circuitry (such as circuitry 300) for the leak alert system 108 and/or pump shut-off system 110. According to various embodiments, such circuitry may be provided within a housing 422 attached to pump 400. In embodiments, housing 422 may be coupled to the motor housing 404, and may include a port 423 for receiving connective wiring 424 for coupling the sensor 106 to the leak alert system and/or pump shut-off system circuitry. Additionally, housing 422 may include an alarm component 426 for producing lights and/or sound according to leak alert system 108.

Figure 10:
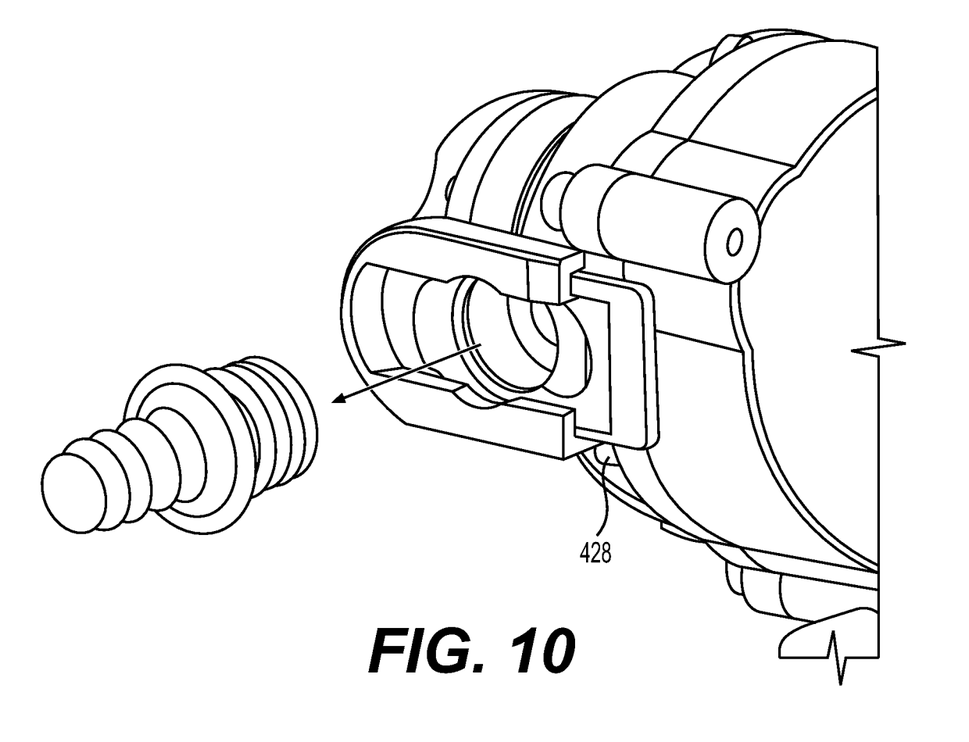
FIG. 10 illustrates the removal of a port of the pump of FIG. 4, in accordance with various embodiments.

According to various embodiments, the pump head assembly 402/pump head housing 401 may be replaceable, and may include various quick connect terminals, plumbing fittings, which can be unplugged and disconnected for easy replacement. For example, housing 401 may be disconnect from housing 404 by disconnecting connective wiring 424 from port 423, and further disconnecting the pressure switch wires 413. Thereafter, ports for the inlet and outlet 112, 114 may be removed via sliding connection clips 428 which release the ports, as shown in FIG. 10, then removing attachment members/screws 206 to disassemble housing 401 from housing 404. As such, pump head assembly 402 may be repaired and/or replaced while preserving the motor assembly 405.

Figure 11:
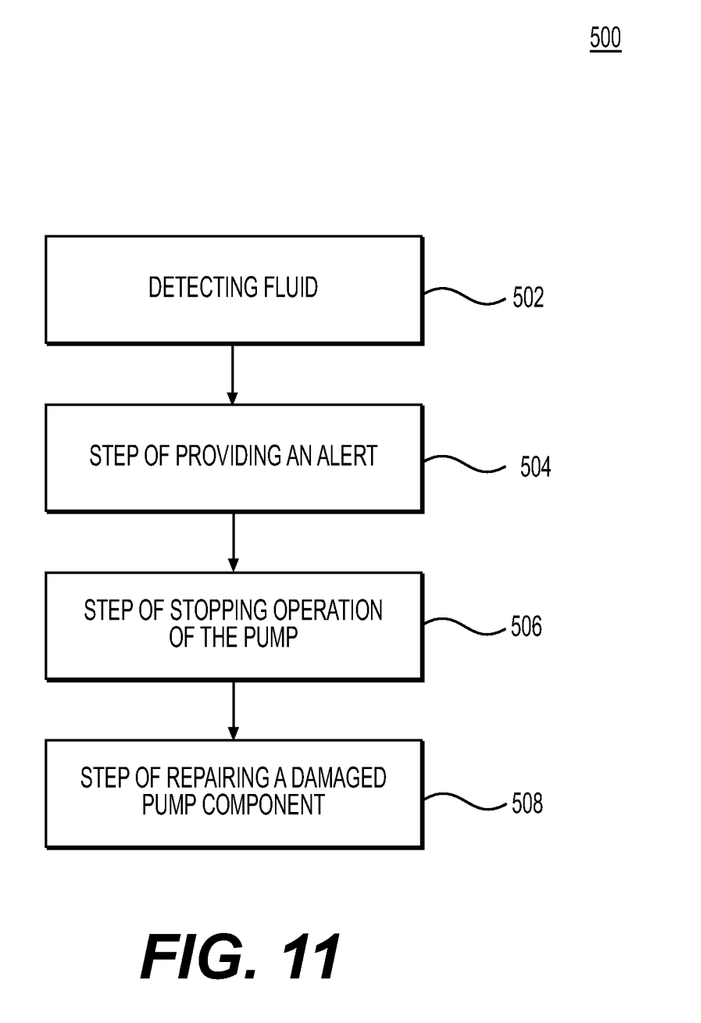
FIG. 11 shows a pump method, in accordance with various embodiments.

FIG. 11 provides a pump method 500 to protect the pump from internal component damage due to leaking of pumped fluid within the pump and/or to protect an external pump environment from damage due to leaking of pumped fluid. According to various embodiments, pump method 500 may comprise detecting fluid within an area of the pump outside a pump chamber of the pump via a fluid detector located within the pump (step 502). In some embodiments, pump method 500 may comprise providing an alert upon detection of leaked fluid within the pump (step 504). In some embodiments, pump method 500 may comprise stopping operation of the pump upon detection of leaked fluid within the pump (step 506). In some embodiments, pump method 500 may comprise replacing and/or repairing a damaged pump component upon detection of leaked fluid within the pump (step 508).

According to various embodiments, pumped fluid may include water, corrosive fluid such as bleach (sodium hypochlorite), agricultural chemicals (e.g. pesticides), and/or various oils and fuels such as petroleum based fluids, and the like. In some embodiments, the pump may be an electric diaphragm pump.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

LIST OF ELEMENTS 100 pump/pump system
101 fluid
102 pump chamber
104 pump area outside of pump chamber 102
105 seal
106 fluid sensor
107 pump area comprising the seal 105
108 leak alert system
110 shut-off control system
112 inlet
114 outlet
116 diaphragm
120 pump components located outside of pump chamber 102
200, 202 probes of fluid sensor
203 sensor wire(s)
204 air gap between probes 200, 202
205 channel for routing sensor wire(s) 203
206 base of fluid sensor 106
300 circuit
302 battery
400 electric diaphragm pump
401 first housing (pump head housing)
402 pump head assembly
403 diaphragm drive chamber
404 second housing (motor housing)
405 motor assembly
406 attachment members
407 cavity of the drive chamber 403 (drive chamber cavity)
408 wobble plate
409 diaphragm pumping member
410 pistons
411 pressure switch assembly including pressure switch 411a, pressure switch seal 411b, and pressure switch housing 411d
412 output shaft of motor assembly
413 pressure switch wires
414 motor bearing
415 diaphragm drive components
416 back side of the diaphragm 116
418 connection points
420 upper surface of the base 206
422 housing for circuitry
423 port
424 connective wiring
426 alarm component
428 connection clips
500 pump method
502 step of detecting fluid
504 step of providing an alert
506 step of stopping operation of the pump
508 step of repairing a damaged pump component

The invention claimed is:

1. An electric diaphragm pump comprising:
a pump head assembly in a first housing;
a motor assembly in a second housing;
a fluid sensor; and
a leak alert system and/or pump shut-off control system,
wherein the first housing is coupled to the second housing,
wherein said pump head assembly includes a seal comprising a diaphragm separating a pump chamber and a diaphragm drive chamber,
wherein fluid may be pumped through the pump chamber,
wherein the seal is configured to prevent said fluid from leaking out of the pump chamber,
wherein the fluid sensor is configured to detect a presence of fluid which has leaked outside of the pump chamber,
wherein the fluid sensor is located within a cavity of the diaphragm drive chamber and outside of the second housing, and wherein the leak alert system is configured to indicate that fluid has been detected by the fluid sensor and wherein the shut-off control system is configured to stop operation of the pump based on fluid being detected by the fluid sensor.

2. The electric diaphragm pump of claim 1, wherein said fluid sensor comprises a first probe, a second probe, and a base supporting said first probe and said second probe,
wherein said first probe and said second probe are spaced apart by an air gap, wherein the presence of fluid across the air gap creates a conductive path between the first probe and the second probe, and
wherein said first probe and said second probe are components of a circuit which activates said leak alert system and/or said shut-off control system.

3. The electric diaphragm pump of claim 2, wherein said base is shaped to integrate with the first housing.

4. The electric diaphragm pump of claim 3, wherein said base is curved to form a fluid collection zone at a bottom portion of the first housing, and to integrate with said cavity, said pump having a cylindrical pump housing.

5. The electric diaphragm pump of claim 1, wherein the pump comprises both the leak alert system and the shut-off control system.

6. The electric diaphragm pump of claim 1, wherein the pump head assembly is removable and/or replaceable.

7. The electric diaphragm pump of claim 1, the pump comprising said leak alert system, wherein said leak alert system is in wired and/or wireless communication with the fluid sensor.

8. The electric diaphragm pump of claim 1, the pump comprising circuitry for said leak alert system and said leak shut-off control system, wherein said circuitry is located in a third housing coupled to said second housing, and wherein said leak alert system and said leak shut-off control system are in electrical communication with the fluid sensor.

9. The electric diaphragm pump of claim 1, further comprising diaphragm drive components that include a wobble plate in driving engagement with a diaphragm pumping member via an output shaft of the motor assembly, the diaphragm pumping member including one or more pistons which are integral with the diaphragm .

10. An electric diaphragm pump comprising:
a pump housing comprising a first housing and a second housing;
a pump head assembly in the first housing;
a motor assembly in the second housing;
a fluid sensor; and
a leak alert system and/or pump shut-off control system,
wherein the first housing is coupled to the second housing,
wherein said pump head assembly includes a seal comprising a diaphragm between a pump chamber and a diaphragm drive chamber, the pump chamber and diaphragm drive chamber at least partially defined in the pump head assembly,
wherein the seal is configured to prevent fluid from leaking out of the pump chamber,
wherein the fluid sensor is configured to detect a presence of fluid which has leaked outside of the pump chamber,
wherein the fluid sensor is located in the diaphragm drive chamber and outside of the second housing,
wherein said fluid sensor comprises a first probe, a second probe supported on a curved surface of a base, the base having the curved surface to integrate with the pump housing,
wherein said first probe and said second probe are spaced apart by an air gap,
wherein the presence of fluid across the air gap creates a conductive path between the first probe and the second probe,
wherein said first probe and said second probe are components of a circuit which activates said leak alert system and/or said shut-off control system, and
wherein the leak alert system is configured to indicate that fluid has been detected by the fluid sensor and wherein the shut-off control system is configured to stop operation of the pump based on fluid being detected by the fluid sensor.

11. The electric diaphragm pump of claim 10, wherein the pump housing is cylindrical and wherein the base is curved for integrating with a curvature of said pump housing and/or forming a fluid collection zone.

12. The electric diaphragm pump of claim 10, wherein the fluid sensor is located within a cavity of the diaphragm drive chamber.

13. The electric diaphragm pump of claim 10, wherein the pump has a single diaphragm.

14. The electric diaphragm pump of claim 10, wherein the pump comprises both the leak alert system and the shut-off control system.

15. The electric diaphragm pump of claim 10, wherein the pump head assembly is removable and/or replaceable.

16. The electric diaphragm pump of claim 10, the pump comprising said leak alert system, wherein said leak alert system is in wired and/or wireless communication with the fluid sensor.

17. The electric diaphragm pump of claim 10, the pump comprising circuitry for said leak alert system and said leak shut-off control system, wherein said circuitry is located in a third housing coupled to said second housing, and wherein said leak alert system and said leak shut-off control system are in electrical communication with the fluid sensor.

18. The electric diaphragm pump of claim 10, wherein said further comprising diaphragm drive components including a wobble plate in driving engagement with a diaphragm pumping member via an output shaft of the motor assembly and wherein said diaphragm pumping member includes one or more pistons which are integral with the diaphragm.

19. An electric diaphragm pump comprising:
a pump housing comprising a first housing and a second housing which is coupled to the first housing;
a pump head assembly in the first housing;
a motor assembly in the second housing;
a fluid sensor; and
a leak alert system and a pump shut-off control system,
a third housing coupled to said pump housing, said third housing comprising circuitry for said leak alert system and said leak shut-off control system, said leak alert system and said leak shut-off control system being in communication with the fluid sensor,
wherein said pump head assembly includes a seal comprising a diaphragm directly between a pump chamber and a diaphragm drive chamber at least partially defined in the pump head assembly,
wherein the diaphragm drive chamber includes diaphragm drive components configured to drive a pumping motion of the diaphragm, such that fluid may be pumped through the pump chamber via said pumping motion, said diaphragm drive components including a wobble plate in driving engagement with a diaphragm pumping member via an output shaft of the motor assembly and wherein said pumping member includes one or more pistons which are integral with the diaphragm, wherein the seal is configured to prevent said fluid from leaking out of the pump chamber, wherein the fluid sensor is configured to detect a presence of fluid which has leaked outside of the pump chamber before the fluid enters the second housing, wherein the fluid sensor is located in a cavity of the diaphragm drive chamber and outside of the second housing, wherein said fluid sensor comprises a first probe and a second probe, wherein said first probe and said second probe are spaced apart by an air gap, wherein the presence of fluid across the air gap creates a conductive path between the first probe and the second probe, wherein said first probe and said second probe are components of a circuit which activates said leak alert system and said shut-off control system, and wherein the leak alert system is configured to indicate that fluid has been detected by the fluid sensor and wherein the shut-off control system is configured to stop operation of the pump based on fluid being detected by the fluid sensor.

* * * * *